UNITED STATES PATENT OFFICE.

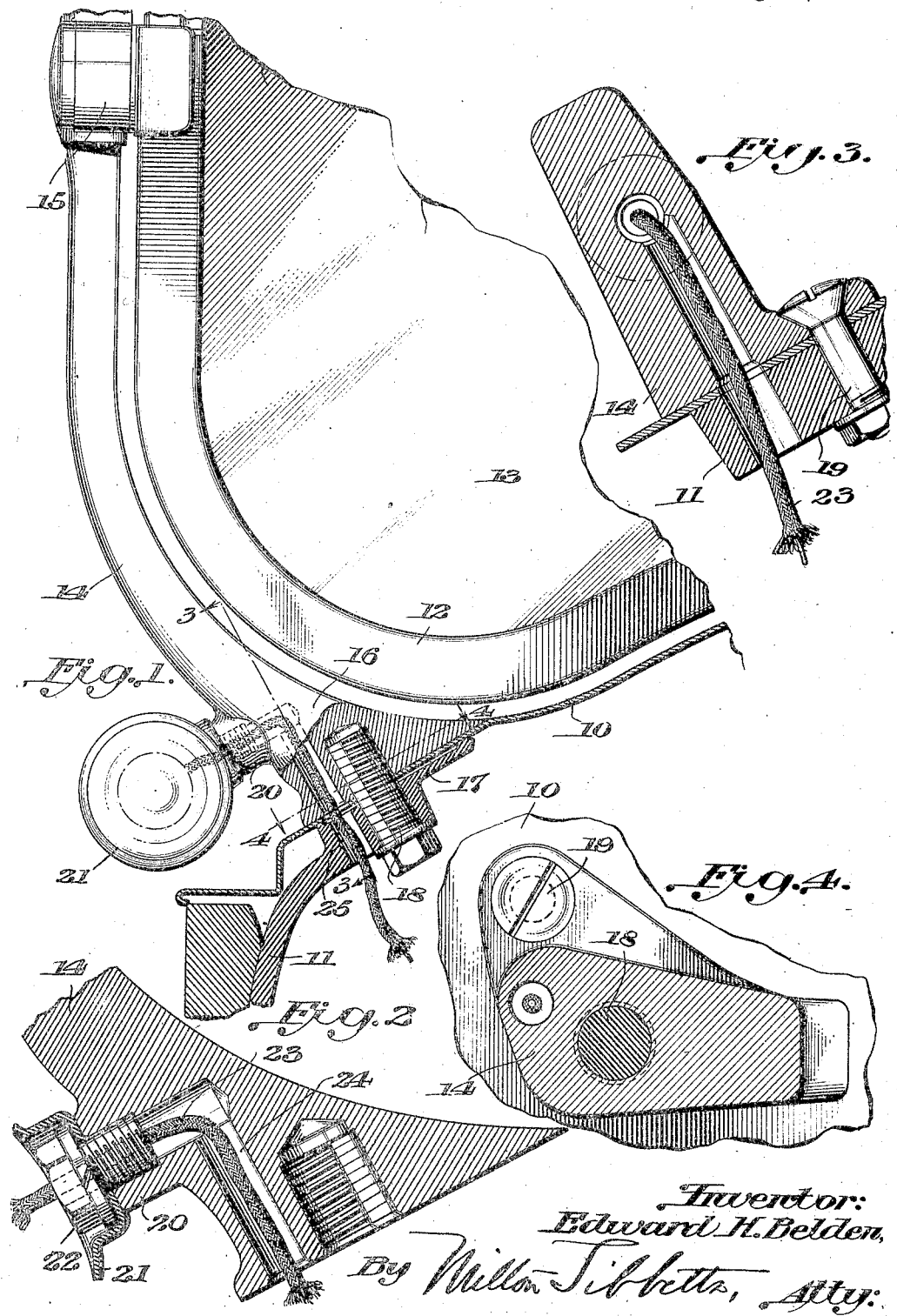

EDWARD H. BELDEN, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,276,014.　　　Specification of Letters Patent.　　Patented Aug. 20, 1918.

Application filed December 14, 1917. Serial No. 207,128.

*To all whom it may concern:*

Be it known that I, EDWARD H. BELDEN, a citizen of the United States, and resident of Detroit, Wayne county, State of Michigan, have invented certain new and useful Improvements in Motor-Vehicles, of which the following is a specification.

This invention relates to motor vehicles and particularly to the lamp and windshield supporting arrangement thereof.

One of the objects of the invention is to support a side lamp on a motor vehicle with its wires extending through the windshield support and cowl.

Another object of the invention is to provide a detachable connection between the windshield support and cowl of a motor vehicle together with an arrangement of a side lamp on the windshield support with its wires extending through the support and through the cowl.

Other objects of the invention will appear from the following description taken in connection with the drawings which form a part of this specification, and in which:

Figure 1 is an elevation and part sectional view of a portion of a motor vehicle cowl and windshield construction with a side lamp mounted on the windshield support;

Fig. 2 is an enlarged sectional view through a portion of the windshield support;

Fig. 3 is an enlarged section on the line 3—3 of Fig. 1; and

Fig. 4 is an enlarged section on the line 4—4 of Fig. 1.

Referring to the drawings, 10 represents a portion of the cowl or dash of a motor vehicle and 11 is one of the stiffening brackets of the cowl, these parts forming a portion of the motor vehicle body. A windshield is shown as detachably connected to the cowl 10 and comprises a sash 12 having glass 13, and a bracket or support 14 to which the sash 12 is pivoted as at 15. The support 14 has an enlarged lower end 16 adapted to seat on a flat part 17 of the cowl 10 and there secured to the cowl as by bolts 18 and 19, the former being shown particularly in Fig. 1 and the latter in Fig. 3. Both of these bolts are shown in Fig. 4.

The support 14 is also formed with a side boss 20 to which is detachably secured a side lamp 21. The lamp securing means is in the form of a hollow bolt 22, shown particularly in Fig. 2, and the wiring for the lamp extends through this bolt. With the single wire system in which the metal work of the body constitutes the return conductor of the circuit, but one insulated wire 23 is used. This wire after passing through the bolt 22 extends through an L-shaped conduit 24 formed in an enlarged part 16 of the support 14 and through a conduit 25 in the cowl 10 and particularly in the bracket part 11 thereof. Thus, the conduits 24 and 25 register where the support 14 joins the cowl and the two conduits form a housing for the wire 23 of the lamp.

The above described arrangement of parts forms a particularly neat construction for motor vehicle use and the lamp and wiring are easily installed and are adequately housed.

It will be understood that my invention is not limited to the details of construction shown and other forms may be used without departing from the spirit or scope of the invention.

Having thus described my invention, what I claim and desire to secure by Letters Patent is:—

1. In a motor vehicle, the combination with the cowl and a windshield support mounted thereon, of a lamp secured to said support, and wires for the lamp extending through the cowl and the windshield support.

2. In a motor vehicle, the combination with the cowl and a windshield support mounted thereon, said cowl and support having registering conduits therethrough, of a lamp secured to said support and having wires extending through said conduits.

3. In a motor vehicle, the combination with the cowl and a windshield support mounted thereon, of a lamp mounted on the vehicle and having wires extending through the cowl and the windshield support.

4. In a motor vehicle, the combination with the cowl and a windshield support detachably connected thereto, said cowl and support having registering conduits, of a lamp detachably secured to the support and having wires extending through said conduits.

In testimony whereof I affix my signature.

EDWARD H. BELDEN.